Nov. 2, 1926.

A. LEROI 1,605,671

HANDLE FOR COLD AND HOT WATER COCKS

Filed Jan. 20, 1925

Inventor:
Alfred Leroi

Patented Nov. 2, 1926.

1,605,671

UNITED STATES PATENT OFFICE.

ALFRED LEROI, OF FRANKFORT-ON-THE-MAIN, GERMANY.

HANDLE FOR COLD AND HOT WATER COCKS.

Application filed January 20, 1925. Serial No. 3,637.

This invention relates to a cock handle produced with simple means and designed for regulating the outflow of cold and hot water. The characteristic feature of the invention is that the pressed sheet metal parts which form the hollow space for the cock handle are connected with one another by means of one screw carrying the inscription, the rounded surface of the cock to be gripped with the hand being not interrupted as is the case when the several parts are connected with one another by a screw which is accessible from above.

An embodiment of the invention is shown, by way of example, in the accompanying drawing, in which.

Figure 1:
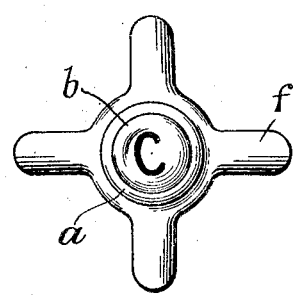
Fig. 1 is a plan view of the cock handle.
Figure 2:
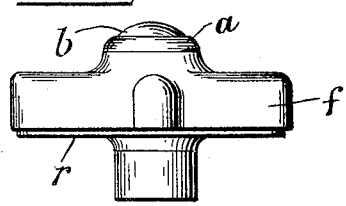
Fig. 2 is a side elevation of the cock handle.
Figure 3:
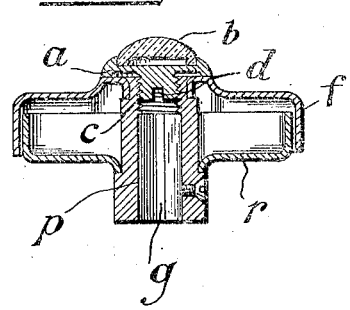
Fig. 3 is a section.
Figure 4:
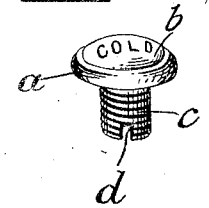
Fig. 4 shows the screw which serves to connect all the parts.

The cock handle consists essentially of four parts, viz, the star-shaped top part $f$ pressed from sheet metal so that it is open at the lower end, the star-shaped bottom part $r$ pressed from sheet metal, the shaft $p$ and the connecting screw. The handle shaft $p$ is tubular and internally threaded at its upper part; its lower part is of square cross section to be mounted on the square cock spindle. The tubular shaft $p$ has further two shoulders designed to serve as seats for the top part $f$ and for the bottom part $r$ as shown in Fig. 3. As shown in Fig. 4 the screw is a head screw with large head plate $a$ marked with the inscription "Warm" or "Cold", the threaded shaft $c$ of the screw having in its lower surface the slot $d$ for the screw driver.

The several parts are put together in the following manner:

On the shaft $p$ the bottom part $r$ of the handle is mounted first and then the top part $f$ whereupon the head screw $a$, $c$ is screwed in. The screw is tightened with the aid of a screw driver inserted from below into the square part $g$ of the handle shaft $p$.

The handle, which is of light weight, cheap to manufacture and elastic has no projecting edges by which the hand could be damaged as no sharp-edged surfaces are required for tightening the screw $a$, $c$.

The head of the screw can however carry inscriptions, for instance enamelled words, indicating the state of the liquid to be delivered by the cock.

I claim:—

A handle for cocks for cold and hot water comprising in combination a star-shaped top part pressed from sheet metal, a star-shaped bottom part pressed from sheet metal, a hollow shaft comprising an internally threaded upper part, a lower part of square cross section and two shoulders near the upper and lower ends designed to serve as seats for the said hollow star-shaped top and bottom parts, and a connecting screw having a large rounded head marked with an inscription and an incision in its lower end for a screw driver to be inserted from below into said hollow handle shaft.

In testimony whereof I affix my signature.

ALFRED LEROI.